(12) United States Patent
Marcheret et al.

(10) Patent No.: US 12,165,426 B2
(45) Date of Patent: Dec. 10, 2024

(54) VISUAL STRUCTURE OF DOCUMENTS IN QUESTION ANSWERING

(71) Applicant: Pryon Incorporated, Raleigh, NC (US)

(72) Inventors: Etienne Marcheret, White Plains, NY (US); David Nahamoo, Great Neck, NY (US); Dominique O'Donnell, Waltham, MA (US); Vaibhava Goel, Chappaqua, NY (US); Chul Sung, Fort Lee, NJ (US); Steven John Rennie, Yorktown Heights, NY (US); Igor Roditis Jablokov, Raleigh, NC (US); Soonthorn Ativanichayaphong, New York, NY (US); Ajinkya Jitendra Zadbuke, Cambridge, MA (US); Carmi Rothberg, New York, NY (US); Marie Wenzel Meteer, Arlington, MA (US); Ellen Eide Kislal, Leawood, KS (US); John Michael Pruitt, Seattle, WA (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 18/606,668

(22) Filed: Mar. 15, 2024

(65) Prior Publication Data

US 2024/0249545 A1   Jul. 25, 2024

Related U.S. Application Data

(63) Continuation of application No. PCT/US2023/027316, filed on Jul. 11, 2023.

(60) Provisional application No. 63/423,527, filed on Nov. 8, 2022, provisional application No. 63/388,046, filed on Jul. 11, 2022.

(51) Int. Cl.
  *G06V 30/414* (2022.01)
  *G06F 16/332* (2019.01)
  *G06F 40/30* (2020.01)

(52) U.S. Cl.
  CPC ........ *G06V 30/414* (2022.01); *G06F 16/3329* (2019.01); *G06F 40/30* (2020.01)

(58) Field of Classification Search
  CPC ...... G06F 16/322; G06F 40/30; G06V 30/414
  See application file for complete search history.

(56) References Cited

U.S. PATENT DOCUMENTS

| | | | | |
|---|---|---|---|---|
| 11,010,284 | B1* | 5/2021 | Santiago | G06N 20/00 |
| 11,080,336 | B2* | 8/2021 | Van Dusen | G06Q 10/10 |
| 11,561,987 | B1* | 1/2023 | Sager | G06F 16/906 |

(Continued)

FOREIGN PATENT DOCUMENTS

| | | |
|---|---|---|
| CN | 111897937 A | 11/2020 |
| CN | 112199254 A | 1/2021 |

(Continued)

OTHER PUBLICATIONS

International Search Report and Written Opinion, PCT Application No. PCT/US2023/027316, mailed Oct. 24, 2023 (7 pages).

*Primary Examiner* — Kevin Ky
(74) *Attorney, Agent, or Firm* — Occhiuti & Rohlicek LLP (57) ABSTRACT

A question-answering system that receive a natural-language question includes a database to provide a basis for that answer and a structured-query generator that constructs a structured query from the question and uses it to obtain an answer to the question from the database.

18 Claims, 3 Drawing Sheets

(56) References Cited

U.S. PATENT DOCUMENTS

| | | |
|---|---|---|
| 2007/0150458 A1 | 6/2007 | Chung et al. |
| 2007/0288439 A1 | 12/2007 | Rappaport et al. |
| 2008/0270380 A1* | 10/2008 | Ohrn ................. G06F 16/345 |
| | | 707/999.005 |
| 2011/0196852 A1 | 8/2011 | Srikanth et al. |
| 2012/0078873 A1* | 3/2012 | Ferrucci ............. G06F 16/3329 |
| | | 707/E17.014 |
| 2014/0304250 A1 | 10/2014 | Sankar et al. |
| 2015/0178853 A1* | 6/2015 | Byron ................. G06F 16/28 |
| | | 705/30 |
| 2016/0364377 A1* | 12/2016 | Krishnamurthy ....... G06F 40/35 |
| 2017/0024465 A1 | 1/2017 | Yeh et al. |
| 2017/0060990 A1 | 3/2017 | Brown et al. |
| 2017/0308531 A1 | 10/2017 | Ma et al. |
| 2017/0344640 A1 | 11/2017 | Goldstein et al. |
| 2018/0046764 A1* | 2/2018 | Katwala ................ G16H 15/00 |
| 2018/0143975 A1* | 5/2018 | Casal .................. G06F 40/51 |
| 2018/0189630 A1 | 7/2018 | Boguraev et al. |
| 2018/0232376 A1 | 8/2018 | Zhu et al. |
| 2018/0260738 A1 | 9/2018 | Gabbai et al. |
| 2019/0042988 A1* | 2/2019 | Brown ................ G06F 16/9535 |
| 2020/0257679 A1 | 8/2020 | Sheinin et al. |
| 2021/0022688 A1 | 1/2021 | Lee et al. |
| 2021/0097405 A1* | 4/2021 | McNeil ................. G06N 5/045 |
| 2021/0157975 A1* | 5/2021 | Gelosi ................. G06F 40/166 |
| 2021/0287141 A1* | 9/2021 | Molloy ................. G06F 18/22 |
| 2021/0319066 A1* | 10/2021 | Boxwell ............... G06F 40/131 |
| 2021/0365481 A1 | 11/2021 | Chen |
| 2021/0397609 A1 | 12/2021 | Yurtsev et al. |
| 2021/0406264 A1 | 12/2021 | Nahamoo et al. |
| 2021/0406735 A1 | 12/2021 | Nahamoo et al. |
| 2024/0135291 A1* | 4/2024 | Steenstra ........... G06Q 10/0637 |
| 2024/0154941 A1* | 5/2024 | Nagpal ................. H04L 63/18 |

FOREIGN PATENT DOCUMENTS

| | | |
|---|---|---|
| CN | 114090760 A | 2/2022 |
| KR | 100347799 B1 | 8/2002 |
| KR | 10-2019-0079805 A | 7/2019 |
| KR | 10-2019-0118744 A | 10/2019 |
| KR | 10-2022-0083450 A | 6/2022 |

* cited by examiner

VISUAL STRUCTURE OF DOCUMENTS IN QUESTION ANSWERING

CROSS-REFERENCE TO RELATED APPLICATIONS

This application is continuation of International Application No. PCT/US2023/027316, filed Jul. 11, 2023, which claims the benefit of the filing date of U.S. Provisional Application No. 63/388,046, filed Jul. 11, 2022, and U.S. Provisional Application No. 63/423,527, filed Nov. 8, 2022, the contents of all which are herein incorporated by reference in their entireties.

BACKGROUND OF THE INVENTION

The invention pertains to question-answering ("QA") systems, and in particular, to natural-language question-answering systems.

A question-answering system receives written or spoken questions. A "natural-language" question-answering system is one that receives and answers questions posed in a colloquial form that one might use when speaking to another person and replies using a similar natural-language answer.

A natural-language question-answering system may thus create the impression of interacting with a human being. In part because of this and their overall ease of use, such systems are often used by organizations to answer questions within a limited domain of knowledge.

To answer a question, the question-answering system draws upon information contained in a "knowledge base." The knowledge base is compiled beforehand from numerous documents that include information relevant to a particular domain of knowledge.

The documents are of the type one might see in print, such as books, manuals, papers, spec sheets, and the like, and/or viewed on a computer screen, such as web pages. In some cases, these documents are scanned images of physical documents stored in computer files. In other cases, these documents are "digitally born," i.e., they have arisen without having to scan a physical document. Also among the documents are hybrid documents that have both scanned content and digitally-born content. In all of these cases, the document can be rendered in a visible form. The question-answering system makes use of text and images found in such documents.

Documents as described above can be created in many different ways. Thus, it is not surprising that they are received in any one of various formats, including portable document formats, text files, and proprietary formats associated with various applications. To enable the question-answering system to access information in these documents, the process of building a knowledge base includes certain pre-processing steps that include, among other things, causing information in those documents to be made available in a common format. For example, a question-answering system may use the text of the documents, which may be directly accessible in a digital format or which may be obtained using Optical Character Recognition (OCR) of an image of a document.

The pre-processing of such documents is often called "ingestion." The ingestion process includes certain processing steps to make it easier to find information needed to answer questions. Details about ingestion itself as well as the structure and operation of a question-answering system of the type contemplated herein are described in WO2021/263138, published on Dec. 30, 2021, the contents of which are incorporated herein by reference.

SUMMARY OF THE INVENTION

A number of information retrieval tasks, such as natural-language based question answering, may be performed on the text content of documents. However, a number of tasks may make use of visual structure of documents (e.g., the arrangement of parts of a document and/or their visual appearance such as font size, style or color, or background color), which may not be evident from the text content of the document, for one or more purposes. These uses of visual structure may include (1) extracting more information for use in question answering than may be available from a document text alone, (2) enhanced presentation of information (e.g., answers) back to a user making a query, and/or (3) lower-level processing, such as optical character recognition (OCR), of document images.

Some documents that are processed (e.g., "ingested") for later information retrieval may have semantic markup, such as tagged headings, subheadings, page headings, figure captions, and the like. However, in practice such markup is rare, and even if the document has markup, it may not expose semantic relationships between elements, for example, with the markup focusing on rendering of the document rather than its contents. An example of a markup that might expose semantic structure is a Structured Generalized Markup Language (SGML) document format, which may identify nested elements such as Chapters, Sections, and Sub-Sections. An example of a markup that may affect visual characteristics of a rendering, for example, as commonly used for Web pages, is the Hyper-Text Markup Language (HTML).

However, in many cases, while tags may affect font sizes and alignment, they may not expose the semantic relationships between elements. Another format that can be considered to be a markup is the Postscript format, or its embedding in a Portable Document Format (PDF) document. The Postscript format can explicitly encode the locations and visual characteristics of letters and other elements as they would be printed on a page (e.g., as it they are instructions for a typesetting machine) without exposing semantic relationships between elements.

Note that in the discussion below, when referring to "visual structure" we mean this to include encoding of the structure of pages as they would be rendered (e.g., on a screen or printed page) without requiring that the pages actually be rendered, or even formed in a pixel image form for automated processing. That is, the rendering may be simulated in order to infer the visual structure of a document. Furthermore, when referring to "vision based" processing of a document, we refer to the processing that an automated image processing system may perform.

A first step in making use of the visual structure in an input document is segmentation into separate parts, which may be referred to as "visual segments." This step may be followed by interpretation of the parts and linking of different parts to aid in later information retrieval. In some cases, the segmentation is performed prior to OCR. In some cases, the OCR may be performed prior to segmentation, or the letters of the document have been explicitly encoded in the document (e.g., as in a Postscript format). In cases where the segmentation is performed prior to OCR, the segmentation may improve the OCR process, for example, by enabling isolation of OCR of one segment from OCR of another segment.

A document of the type ingested by a question-answering system typically contains text, and may further include explicit figures or embedded tables and images. These will collectively be referred to herein as "textual information", and when distinguishing between the textual information available directly in the document as the "input textual information" or the "original textual information," and when determined during the ingestions as the "derived textual information" or the "OCR text."

However, as introduced above the total information contained in the document turns out to be greater than that provided by the textual information alone. In fact, a document includes structural information, which refers to be all information that is not included in the textual information (i.e., the textual information and the structural information together form the information extracted from the documents for question answering). This structural information is visible to a reader of a document when the document is rendered and is not available from merely having access to the textual information alone.

The system and methods described herein extract this structural information and make it available to the question-answering system. This improves the accuracy and comprehensiveness of answers to questions.

The structural information includes that gleaned from a document's visual structure. This visual structure comes from having observed the arrangement of the textual content within the document. This visual structure interacts with the textual content in a synergistic way to add semantic information (e.g., context and relationships) that determines the meaning of the text. This addition of semantic context arises, for example, from providing spatial context to the textual content.

One way of determining structure information of a document is visual document segmentation. Such segmentation can identify semantic units such as headings, paragraphs, lists, images, tables, and their captions, and may determine relationships between the units based on spatial relationships in the visual representation. For example, associating an image with a caption may be done by localizing both and associating by proximity. Later, that caption can be used to retrieve the image by natural language. Similarly, the contents of a table in isolation often lack important context that informs what the table contents represents. Identifying the caption for this table by a vision system and associating by proximity we can more reliably retrieve this table with a search query. Furthermore, important context for retrieving the objects can reside in the paragraphs of the document. That can often be explicit in the text (e.g., "As shown in Figure . . . "). Having identified captions to figures and tables, this caption becomes the query against the set of documents to further the context to retrieve the associated tables and images.

Vision based document understanding processing can detect/identify semantic objects with little to no language context (images, tables) associating by proximity detected captions, and using the language of the caption to retrieve against supporting and external documents to further enrich language context of the image/table for search query retrieval.

In a first example of processing of document images to identify structure, a first step involves, for a particular page image, identifying segments of the image in which information is presented, and preferably associating each segment with a semantic label, such as "heading," "caption," etc. In some examples, these segments are optionally assumed to be rectangular regions, which may be referred to as "bounding boxes" defined by the coordinates of their upper left and lower right corners. One approach to detection of the segments is rule-based, whereby a human designer may craft rules such as "A wide short section within the top x % of the page image is a 'page header'". Another approach is to use a machine-learning approach in which a training corpus of segmented page images is used to train (e.g., estimate values of configurable parameters of) a segment detector. For example, the segment detector may make use of convolutional neural networks that output indicators of corners of bounding boxes for various labeled segments. The output of the segment detector is then used to identify the segments. The segments may be disjoint (i.e., non-overlapping), or optionally some segments may be permitted to have nested segments, for instance, a "graph" segment may be permitted to have an "axis label" nested segment within it, a list indented within a list, or paragraph within a table.

In the case of processing of document images, the segmentation may be used to improve character recognition accuracy. One approach to improving character recognition involves background estimation. For example, a segment with a dark background may be "lightened" prior to character recognition. More generally, the image content of a segment may be used to form a mapping of a greyscale or color space into a standardized scale based on what is present in the segment. For example, the standardized scale may be a greyscale with a target cumulative intensity distribution. In the case of color images, the color content can enter into determining the mapping, for example, if there is white text on a blue background, white may map to black, and blue may map to white, thereby standardizing the image. A variety of techniques may be used to determine the mapping, for example, by determining a distribution of the color and/or intensity of points (e.g., pixels) in the segment image, and forming a mapping to a greyscale or black-and-white (e.g., binary) image. Preferably, the OCR system has been trained or configured to process character images in such a standardized scale, thereby improving character recognition accuracy.

Other preprocessing steps that may be used include rescaling, binarization, noise removal, dilation/erosion, and/or rotation/deskewing. The character recognition task may be addressed as a sequence decoding problem, with optimal decoding of sequences being achieved with recurrent networks or transformers. One approach is to train a recurrent network or transformer, so such networks have implicit character and word language model embedded in their configured parameters. The longer the consistent context (like a caption or paragraph), the better such models may be at predicting the next word, thereby reducing error rates in noisy visual text for example. Another approach is to explicitly train jointly the language model with the underlying words and characters which make up the word. Note that the visually-based segment label (e.g., "caption") may be used to inform the character recognition, for example, via biasing a language model to the type of language that may be found in such a segment.

Segmentation may also improve character recognition by enabling different segments to be processed with different orientations. For example, while a figure caption may have a horizontal orientation, a vertical axis label may be rotated by 90 degrees (e.g., running from bottom to top rather than left to right). As another example, large tables or figures containing text might be in landscape orientation, while the corresponding caption is in portrait orientation, and the text to be recognized along with orientation to be estimated are at the visual segment level, having the advantages of longer consistent context. One approach to accounting for possible rotation is to repeat the OCR process for each segment, for example, with rotations of 0, 90, 180, and 270 degrees. Another approach is for the initial segmentation to estimate the orientation, for example, by having trained a machine learning system to not only provide a segment label but to also provide an estimate of a categorical or continuous text orientation.

As introduced above, the problem of segmentation may also be present even if the characters are explicit in the document format, but the semantic units that form the segments are not explicit. For example, while an Adobe Portable Document Format (pdf) document may have exact representation of the locations at which to place character glyphs, their sizes, rotations, etc., the pdf document may not explicitly expose a visual structure that might be immediately evident to a human reader of the rendered (e.g., printed, displayed) version of that document. One approach to segmenting such document formats is to generate the equivalent document images (e.g., as pixel based images in computer memory), and then form the segments using rule-based or machine-learning techniques discussed above for the purpose of segmentation prior to character recognition. In this case, however, the character recognition stage may return to the explicit document format rather than relying only on the document image. Similarly, some document formats may explicitly encode characters as well as segments (e.g., HTML "<div>" tags), but again such encoding may affect visual presentation without necessarily exposing the semantic classes and relationships.

The original format of the input document dictates the specific steps in arriving at the ingested (e.g., "curated") content. For example, for HTML, a webpage may be first rendered in a virtual, headless browser, and style information is computed for each element on the page. After the source HTML has been expanded to include external style labels, the expanded file is downloaded and preprocessed to ensure validity and to preserve inline formatting. The HTML is then parsed into an element tree, which is recursively explored to create a flattened list of high-level elements, defined according to a combination of hard-coded rules and configurable CSS selectors. All container elements that do not themselves serve semantic functions are replaced by their contents. Once a list of high-level elements has been created, a final post-processing step runs to further ensure HTML validity and re-apply inline formatting. At this stage any elements may be removed or down-weighted based on their tags.

PDF files, by contrast, may undergo a visual processing step in which various structural elements such as headings, tables, and footnotes are identified based on their appearance. Any items which are tagged with undesirable tags such as "table of contents" may be down-weighted or discarded.

A language model may be used to discover irregular texts, including foreign languages. Any text that does not score above some minimum threshold in a general English language model is discarded or down-weighted.

In addition to the curation of the content, it may be advantageous to also canonicalize the document in order to map variations such as PC vs. P.C. to a uniform format. In order to perform this operation, we define a canonical form of a variety of terms as well as the variations which should map to it. Any time one of the non-standard varieties is encountered, it is mapped to the canonical term. The same canonicalization may be applied to the query as well.

Determining of a semantic class of a segment may be based on the processing of a document image, may be based on a classification of text in the segment (e.g., as recognized and/or as provided explicitly in the document format), or may be based on a combination of such sources.

One example of visual segment that may be easily recognizable by a human, but not explicit in a document (either as an image, or encoded in a document format) is a legend related to confidentiality, limits on distribution rights, and the like (e.g., "confidential", "top secret", etc.) Sometimes, such legends are printed in regular text in headers or footers or title pages or may be printed in a manner that is visible but not readily automatically recognized, for example, as a diagonal grey "watermark" printed across the page. Automatic visual segmentation and classification may be used to detect such legends, thereby enabling tagging of the associated information on that page with the require restrictions. Such restrictions may be observed during later information retrieval.

Another example of a visual segment that may be easily recognizable to a human reader is a table of contents (or other structured sections, such as an index). Visual indicia of such a segment can include the list-like format, lead lines or dots linking title words and page numbers, etc. It is generally not desirable to return answers to questions with reference to a table of contents, rather than or in addition to the actual content referenced in the table of contents. Therefore, classification of segments such as this can be used to inhibit retrieval of content from these segments (e.g., eliminate the content of such segments for the purpose of question answering). On the other hand, discovery of a table of contents segment may be useful when linked to the content identified in the table of contents, for example, to provide distant context due to explicit nested headings, which may not be readily discoverable from the remainder of the document itself.

Documents may also have images (e.g., photographs), and text may be present inside these images. For example, a photograph of a natural scene may have street signs or other text that was present for live viewing, and this text may be useful for retrieval. Similarly, a synthesized image may include text, for example, in the form of text overlaying an image. By identifying the image segments, and performing text detection processing on the images, the text can be incorporated into the information available for retrieval from the document. A situation in which synthesized images may be frequent is in presentations (e.g., PowerPoint slides). Often, it is the text in those synthesized images that may provide the most pertinent information available in the document.

Semantic relationships between segments, such as relationships between the content of segments on the same page, or on multiple pages may aid the retrieval of information, may be determined, for example, by spatial relationships. As a simple example, detection and processing of a heading, such as a chapter or section heading in a document, provides content for successive paragraph segments in that chapter or section. One way of encoding such relationships is by linking the segments, for example a paragraph segment being linked to section heading segment with a "in section" link. Such a relationship may be used in ingestion to absorb the context during a single input pass.

Another class of semantic relationship relates to figures and/or tables. Segments of a figure or table may include a (possibly nested) caption. A figure may include a graph with a horizontal and vertical axis label segment or a key segment. These segments may be linked in a semantic graph, for example, with nesting "figure"-"graph"-"axis".

The semantic relationships of visual segments may be extended based on the content of the segments. For example, a text segment (e.g., a paragraph) may include the text "Referring to the graph shown in FIG. 1, . . . " and a caption segment may start with text "FIG. 1. A graph . . . ". These visual segments are linked by their content.

The linkage of segments, such as a caption and text referring to the caption may not be explicit (e.g., "Referring to FIG. 1" and "FIG. 1.") and natural language techniques may be used to determine similarity between segments. For example, a paragraph discussing a graph will likely have similarity to the caption for that graph. One technique to determine such linkage or relationships is to use a question-answering mechanism, for example, treating a caption as a question and locating related paragraphs as answers.

Another type of visual segment whose processing may be informed by visual segmentation is a table. For example, the presence of columnar text, headings at the tops of the columns or to the left of rows, provides a way to organize information. For example, a human viewer scanning a document that includes a table will naturally scan the column and row labels and values at the intersections. One approach to linking of tabular information is to associate each cell in a table (e.g., as a separate segment) with its associated row and/or column heading.

While the relationships between segments may be determined by rules, for example, linking captions with axis labels and the like, another option is to form an entire generative model of a document, including segment placement as well as character placement within segments, and then to address the problem of visual segmentation and character recognition as a combined recognition problem.

Related to processing of the visual structure of a document for the purpose of information retrieval is the problem of determining a structure of a document for the purpose of presenting retrieved information to a user. There may be two formats for a document. The first is the original format of the document as it would be rendered (e.g., printed), and the second is the text format as suitable for natural language processing tasks such as question answering. Neither of these formats is necessarily particularly suitable for presentation of information to a user. For example, the text form used for information retrieval is generally normalized in a way that is useful for automated processing but may obscure the original document properties. For example, if an answer is in a table, it is likely that presenting the original table may be preferable to a normalized text form of the table. On the other hand, presenting the original document has a number of disadvantages. One disadvantage is that different documents are available in a wide array of formats (e.g., pdf, html, scanned/OCR, etc.), and therefore at a practical level, presentation of information may need to be tailored to each format. Furthermore, even with tailoring to each of the document formats, the user may perceive differences in the rendering of a part of a scanned document and part of a structured document, and when multiple top-ranking answers are presented to a user, the disparity of presentation may be distracting. Furthermore, when an output includes context, such as a section heading, a paragraph (e.g., including highlighting of an answer in the paragraph), a referenced graph or table (e.g., including highlighting of an answer represented in the graph or table), it is desirable to assemble output that both resembles (but does not necessarily exactly reproduce) the original document as well as highlighting the answer the user is looking for.

One solution to presentation of information to users in response to information retrieval queries is to use a third format for document, in addition to the original format and the format used for natural language processing, which may be referred to as a "retrieval view." This third format complies with a Document Object Model (DOM), that encodes both the content (i.e., the words), certain formatting properties from the original document, as well as information that is gleaned from the visual segmentation described above, for example, headings, captions, etc. Furthermore, the visual processing, which identifies things like headings, titles, captions, lists, etc. can be used to inject a hierarchy of information into the retrieval view to enhance information presentation value of the retrieval view.

A particular form of this DOM makes use of a "simplified HTML" format in which the markup of the document provides a way to render from the original document that preserves general formatting and structure, but when rendered for presentation to a user does not result in an exact replica of the original document.

Nevertheless, the rendered presentation is preferably visually pleasing ("good looking"), and well organized. The common representation maintained for different original formats also can provide uniformity and consistency over multiple results presented at the same time or in response to different queries.

Returning to the segmentation of a document, the segmentation may improve the quality of retrieved information. By way of a simple example, suppose a document has technical information about gas and steam turbine in different sections, and these section may be long with many pages. A question such as "What is a recommended operating oil pressure for a steam turbine" should preferably find its answer in the steam turbine section. By incorporating the context of the section heading, such as "Steam Turbines", with the context, such as "The oil pressure should be kept between 40 and 80 psi." the correct answer may be retrieved, and an answer meant for gas turbines may be excluded or scored less favorably.

One way of incorporating context, which may be based on relationships between segments formed in the visual segmentation, is to form composite content that combines context with the body of the text. For example, for a paragraph of text or an limited (say 200 word) section of a paragraph, section heading context may be prepended to the text. For example, in the "Steam Turbine" section example, the content to which a question may be mapped could be "Steam Turbine//The oil pressure . . . " where an explicit context boundary "/" may optionally be used. That is, the context is repeated for each section of possible text that is considered for an answer. Preferably, training material for a question answerer uses similarly contextualized passages.

Such contextualization of answers may be extended to a number of situations. For example, cells in a table may be contextualized with the table caption as well as the relevant column and row labels. Text in a graph may be contextualized with axis labels. As another example, items in a visually identified list may be contextualized by a passage (e.g., sentence) that precedes the list.

Contextualization of a passage for an answer may use other approaches than augmenting the result to match against a question, for example, using concatenation. For example, the context may be processed separately from the passage from which an answer may be found, and both the question and the context used (e.g., concatenating embeddings of the question and the answer) to determine the presence of a relevant answer. Yet other more complex models may be used, for example, using attention-based approaches in which words in a potential answer are transformed based on context to yield a contextualized representation of a passage.

Document structure can also be used in multimodal documents. For example, a recording of a video of a presentation with slides may have both audio and visual content. The audio content may be automatically transcribed using a machine-based automatic speech recognizer. Frames of the video may be extracted as images, for example, selected using a key-frame detection approach. The transcription of the audio may be synchronized with the extracted images so that it is known what was being said while the image was being presented.

In such a multimodal case, the image of a frame of a video may be processed using the segment processing approaches described above, for example, to identify a title of a slide, a bulleted list and the like. Furthermore, the sequence of images (e.g., a sequence of slides in the video) may be used to determine long-range context. For example, a major section heading for a number of slides may be presented in a different style (e.g., in a larger font), and that heading may provide context that is used to contextualize later slides.

In such a multimodal case, the transcription associated with a captured frame image may be processed in much the same way as a caption for a figure or text referring to a figure is processed for printed text. For example, if the image shows a graph or a table, the transcription may provide the context for retrieving the image in response to a question.

Text segments in an image may also be used to contextualize the transcription. For example, a speaker of a presentation may omit a context that is apparent from a slide that is presented contemporaneously with the speech. Therefore, the text retrieved from the image may provide context that helps retrieve the transcription.

In the case of multi-modal documents with images or video as well as audio, results may be presented to a user in an audio form, or as a transcription, or both.

A number of general aspects introduced above, which may be used individually or in combination include:

- A vision based document understanding system used to detect/identify semantic objects with little to no language context (images, tables) associating by proximity detected captions.
- Using language of a caption to retrieve supporting and external documents to further enrich language context of the image/table for search query retrieval.
- A method for document processing including processing information representing a visual layout of one or more document units (e.g., printed pages, presentation slides) to identify document segments; and processing the document segments, including determining at least one relationship between two document segments.
- Processing of the visual layout is performed during ingestion of the document into a document repository for later information retrieval.
- Processing the information representing a visual layout includes processing an image representation (e.g., after OCR) or processing layout instructions in a document (e.g., processing instructions in an HTML or Acrobat document) that affect layout of a rendering (e.g., printing or display) of the document.
- Identifying the document segments include classifying the segments (e.g., according to semantic categories, such as headings, captions, titles, paragraphs, lists, icons, etc.).
- Automatically identifying tables can include identifying cells in the tables, and preferably using the identified cells (e.g., their row and column arrangement) to extract structured data from the table.
- Training an object localization/identification system (e.g., a neural network system, for example, including convolutional neural networks, for example trained to locate bounding boxes) to locate and/or classify visual segments (e.g., text regions) of a document.
- Determining relationships between the segments and/or content in the segments according to the classifications of the segments and/or the visual relationships between the segments.
- Using the determined relationships to add context to content in the segments for use in automated question answering tasks.
- Segments can include figures and captions, and preferably relationships between segments can include associating figures and their captions.
- Processing segments separately to improve text extraction, for instance, rotating/deskewing segments separately and/or applying image transformations to enhance characters for automatic character recognition.

In one aspect, the invention features a method that includes constructing a knowledge base for a natural-language question-answering system. The construction of such a knowledge base includes ingesting a document that comprises first, second, and third visual segments, each of which comprises semantic content, and pre-processing the document to enable the question-answering system to access the semantic content in response to a natural-language question that has been posed by a user of the natural-language question-answering system. The pre-processing of the document includes using a visual structure of the document to extract non-semantic information from the document and incorporating the non-semantic information in the knowledge base. The document's visual structure comprises a spatial distribution of the visual segments in the document when the document is in a form that renders the document visible.

Some practices include using the visual structure by carrying out certain steps based in part on locations of the visual segments relative to each other and determining whether or not a context relationship should exist between a pair of visual segments based in part on the locations of those segments.

Among these practices are those that include, based at least in part on locations of the first and second visual segments relative to each other within the document, determining that a context relationship is to exist between the first and second visual segments, based at least in part on locations of the first and third visual segments relative to each other within the document, determining that no context relationship is to exist between the first and third visual segments, and establishing the context relationship between the first and second visual segments but not between the first and third visual segments.

In other practices, using the visual structure includes based at least in part on a distance between the first and second visual segments, determining that a context relationship is to exist between the first and second visual segments, based at least in part on a distance between the first and third visual segments, determining that no context relationship is to exist between the first and third visual segments, and establishing the context relationship between the first and second visual segments.

Still other practices include using semantic information in addition to non-semantic information to determine whether a semantic relationship should exist between a pair of visual segments.

Among these practices are those that include the further steps of, based at least in part on a reference in the first visual segment to the second visual segment, determining that a context relationship is to exist between the first visual segment and the second visual segment, based at least in part on an absence of a reference in the first visual segment to the third visual segment, determining that no context relationship is to exist between the first visual segment and the third visual segment, and establishing the context relationship between the first visual segment and the second visual segment.

In still other practices, using the visual structure to extract structural information from the document comprises classifying the visual segments into different classes based on differences in visual appearances of the visual segments, determining, based at least in part on classes of the first and second visual segments, that a context relationship is to exist between the first and second visual segments, determining, based at least in part on classes of the first and third visual segments, that no context relationship is to exist between the first and second visual segments, and establishing the context relationship between the first and second visual segments.

In still other practices, using the visual structure to extract structural information from the document comprises: based at least in part on locations of the first and second visual segments relative to each other within the document and on semantic content of the first and second visual segments, determining that a context relationship is to exist between the first and second visual segments, based at least in part on locations of the first and third visual segments relative to each other within the document and on semantic content of the first and second visual segments, determining that no context relationship is to exist between the first and third visual segments, and establishing the context relationship between the first and second visual segments.

Further practices of the invention include those in which a context relationship is established between first and second visual segments based on one being a figure and the other being a caption of that figure, based on the two being collocated, i.e., having a common location, and based on one being a figure and the other being text superimposed on the figure.

A variety of documents are contemplated for holding the semantic content. Among these are documents that comprise instructions for causing the document to be rendered visible, in which case the document's visual structure is determined based on those instructions; documents in a portable document format, such as PDF files, in which case the visual structure of the document is determined based on rendering instructions that are expressed in the portable document format; and documents in the form of an HTML file, in which case the document's visual structure is determined based on tags in the HTML file.

Other practices include determining that a first of the visual segments comprises text arranged in rows and columns, determining that a second of the visual segments includes text at an intersection of one of the rows and one of the columns, and establishing a context relationship between the first and second visual segments based at least in part on the determinations.

Also among the practices are those in which using the visual structure to extract structural information from the document comprises tagging at least one of the visual segments as belonging to each class in a set of classes, the set comprising a list, a paragraph, a heading, and an image.

Practices further include those in which one or more of the visual segments includes audio or video. Among these are practices in which the first visual segment comprises audio and the second visual segment includes a transcript of that idea, in which case a context relationship is established between those two visual segments. Also among these practices are those in which first visual segment comprises audio, the second visual segment comprises video, and a context relationship is established between the first and second segments to synchronize the audio and the video.

In another aspect, the invention features an a natural-language question-and-answering system for providing an answer to a question from a user. The natural-language question-and-answering system comprising an ingestor for ingesting documents, each of which, when rendered visible, has a visual structure in which visual segments, each of which comprises semantic content, are spatially distributed throughout the document, a visual parser for extracting structural information from the documents based at least in part on the visual structures thereof, and a knowledge base that incorporates semantic content from the documents and the structural information.

Embodiments include those in which the visual parser comprises a segmenting circuit configured to identify the visual segments and to classify the visual segments into classes, an interpretation circuit to extract semantic information from the visual segments, and a linkage circuit to establish context relationships between selected pairs of visual segments based on input from the segmenting circuit and the interpretation circuit.

These and other features of the invention will be apparent from the following detailed description and the accompanying figures, in which:

DETAILED DESCRIPTION

Figure 1:
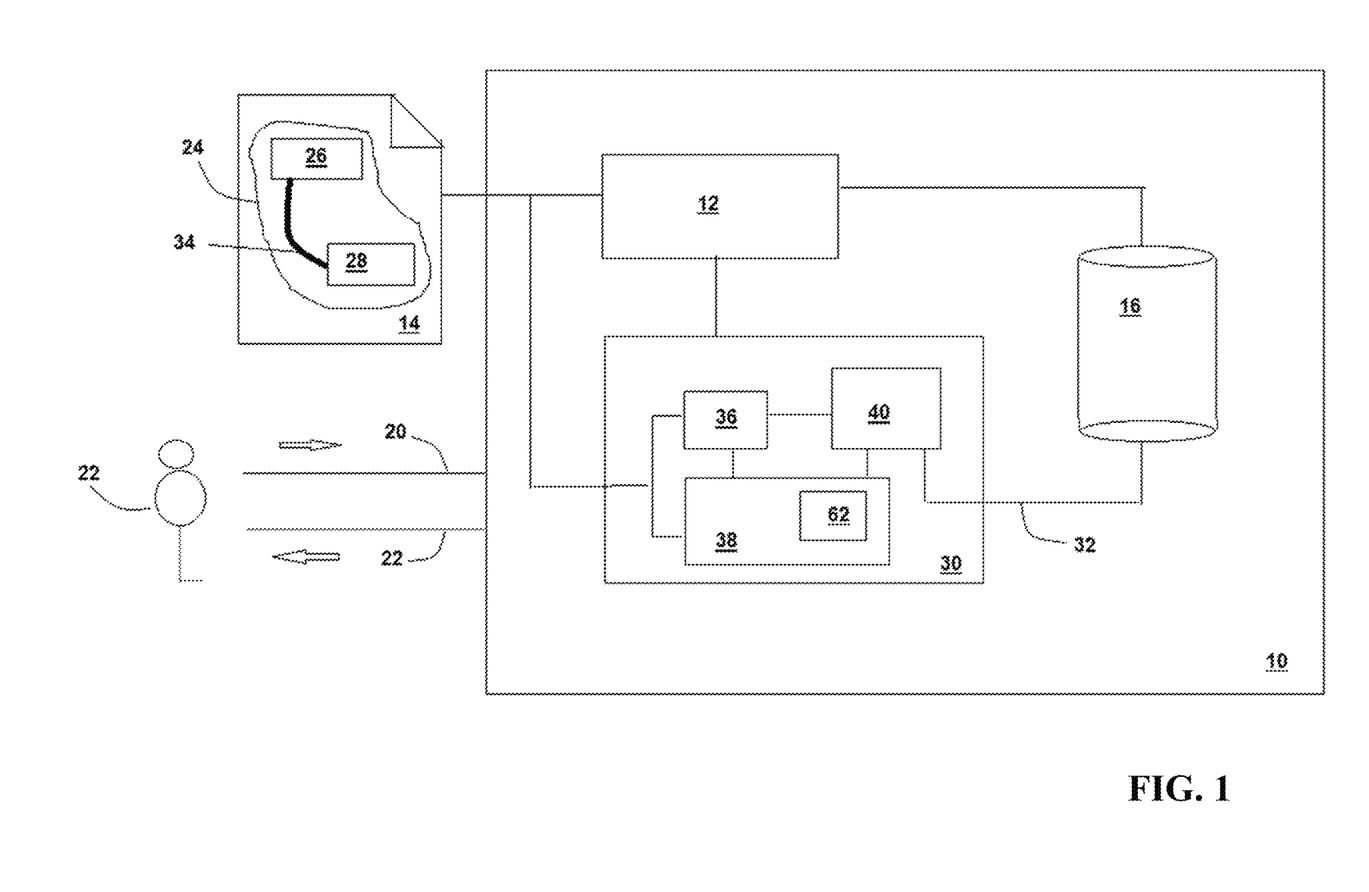
FIG. 1 shows a system for extracting structural information from a document.

FIG. 1 shows a question-answering system 10 that includes an ingestor 12 for ingesting documents 14. The documents 14 are used to build a knowledge base 16. This knowledge base 16 is then consulted to formulate an answer 18 to a question 20 that is asked by a user 22. Both the question 20 and the answer 18 can be spoken or written.

A typical document 14 defines a two-dimensional space having regions that contain semantic content. In many cases, these regions are disjoint. However, in some cases, for example in an image having text embedded therein, these regions overlap.

It is useful to divide the semantic content into "visual segments" 24 and to classify these visual segments 24 into different types, or classes. In addition to visual segment 24, the figure shows specific first and second visual segments 26, 28. The specification will refer to these first and second visual segments 26, 28 where necessary for explanation. The expression "visual segment 24" will be used otherwise.

In most cases, the visual segments 24 comprises static content, such as text and images. However, there exist some documents 14 in which visual segments 24 include dynamic content. Examples of dynamic content include audio and video.

The visual segments 24 contribute semantic information to the document 14. This semantic information arises because each of the visual segments 24 has a particular meaning. The meaning is that which forms in the mind of a typical human who inspects the visual segment 24.

For ease of exposition, it is useful to consider the existence of a mapping from a visual segment 24 to a space that includes all possible meanings. Such a space is referred to herein as the "semantic space."

For each visual segment 26, 28, there exists a "context-free mapping" into the semantic space. The "context-free mapping" is that which exists when the visual segment 26, 28 is viewed in isolation.

By adding context, it is possible to perturb the context-free mapping. In the case of a document 14, some context arises from document's visual structure, namely the distribution of visual segments 24 in the document 14. This visual structure amounts to "structural information" that also contributes to the document's information content. It is to analyze and ultimately to harness this structural information that arises from this visual structure that the question-answering system 10 includes a visual parser 30.

A first visual segment 26 is said to "inform" the second visual segment 28 when the first visual segment's presence perturbs the second visual segment's context-free semantic mapping.

As is apparent, the total amount of information in a document 14 is often greater than the sum of the information of its visual segments 16. A document's total information includes a structural information that arises from interaction of those visual segments 16 through context based on the document's visual structure.

The visual parser 30 extracts this structural information 32 from a document 14, uses it to establish context between visual segments 24, and provides the result to the knowledge base 16. This structural information 32 can then be used to improve the question-answering system's accuracy and comprehensiveness in responding to the question 20.

The visual parser 30 evaluates an extent of the contextual effect of a first visual segment 26 on a second visual segment 28 as a result of their relative locations in a document 14. When appropriate, the visual parser 30 applies an operator, herein referred to as the "contextualize operator" to indicate the existence of this contest.

The contextualize operator is a binary operator whose operands are first and second visual segments 26, 28. Application of the contextualize operator results in a context relationship 34 between its operands, i.e., between the first and second visual segments 26, 28. The question-answering system 10 uses this context relationship 34 when searching the knowledge base 16 for information relevant to the question 20.

The visual parser 30 includes a segmentation circuit 36, an interpretation circuit 38, and a linkage circuit 40.

The segmentation circuit 36 segments the semantic content into visual segments 24 and classifies the resulting visual segments 24 into different types. In some cases, the actual content of visual segments 24 also provides a basis for determining whether a context relationship 34 should be established.

The interpretation circuit 38 extracts semantic information from visual segments 24 to aid in this decision.

The linkage circuit 40 applies the contextualize operator as needed to form a context relationship 34 between first and second visual segments 26, 28. It does so based at least in part on information provided by the segmentation circuit 36 and the interpretation circuit 38.

Figure 2:
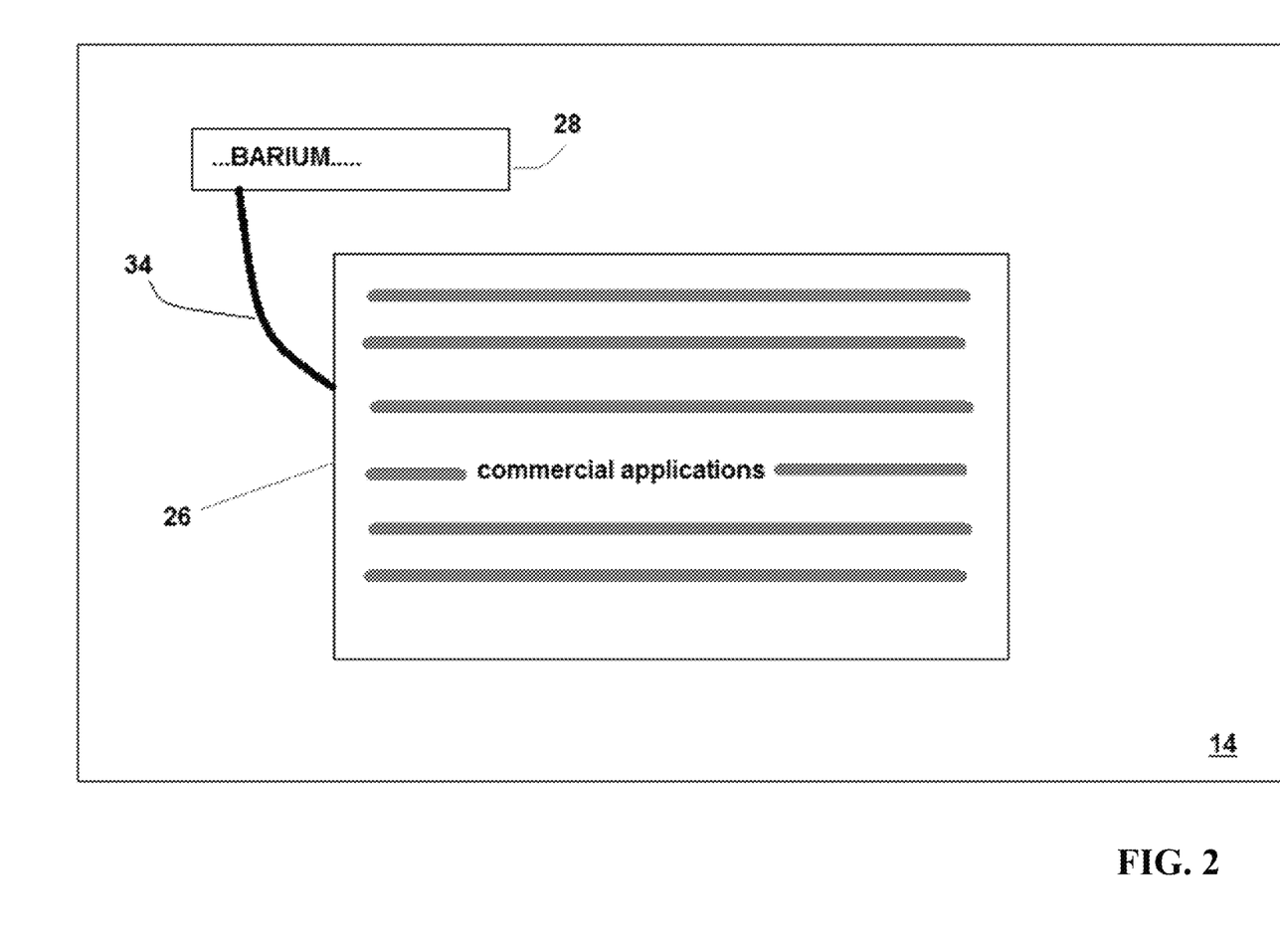
FIG. 2 shows an example of using structural information to establish a context relationship as shown in FIG. 1.

FIG. 2 shows a specific example of the usefulness of a context relationship 34 between first and second visual segments 26, 28. In this example, the first visual segment 26 comprises text that refers to "commercial applications" but omits the word "barium." The second visual segment 28 is a heading that says "Barium." During formation of the knowledge base 16, a context relationship 34 was established between them.

In the absence of a context relationship 34, a question-answering system 10 that receives the question, "What are barium's commercial applications?" would likely ignore the second visual segment 28. After all, although the second visual segment 28 refers to "Barium," it does not hint at commercial applications. The question-answering system 10 might also ignore the first visual segment 26 since it never mentions the word "barium." The resulting answer 18 would thus be disappointing. Relevant information in the knowledge base 16 would never come to light.

However, as a result of the visual parser's activity during preparation of the knowledge base 16, the knowledge base 16 will have acquired structural information 32 that identifies a context relationship 34 between the first and second visual segments 26, 28. With this context relationship 34 in place, the same question 20 would thus lead the question-answering system 10 to the second visual segment 28. Instead of ignoring it, because of omission of any reference to "commercial applications," it would encounter the structural information 32 showing a relationship with the first visual segment 26. As a result, and thanks to the structural information 32, the question-answering system 10 returns a comprehensive answer 18 to the user 22.

FIG. 2 thus represents the fruit of the visual parser's having recognized a topology that is inherent in a document 14 and having made available information indicative of that topology so that diverse portions of the document 14 that would not otherwise appear to have any apparent relationship (other than being in the same document 14) can cooperate synergistically to more fully answer a question 20.

An initial step in extracting structural information 32 from the document's visual structure is that of having the segmentation circuit 36 identify distinct visual segments 24 and where they are located within the document 14.

Based on the distribution of semantic content, such as text and images, the segmentation circuit 36 carries out a segmentation procedure by parsing the document 14 into visually observable visual segments 24 and identifying boundaries between the various visual segments 24. In some embodiments, the segmentation circuit 36 carries this out by using a parsing model that has been trained to recognize visually prominent features that correspond to different types of visual segments 24.

Figure 3:
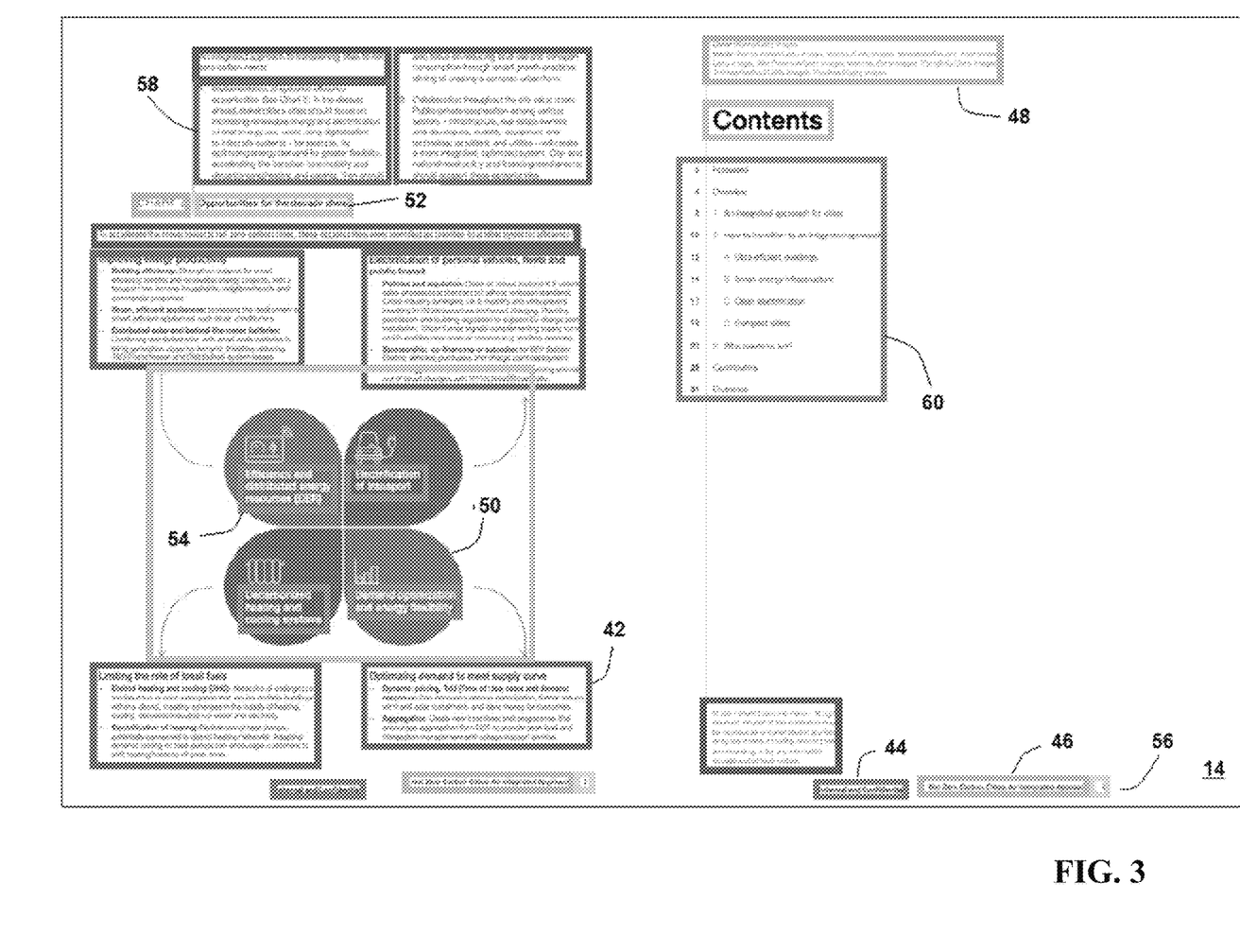
FIG. 3 shows various classes of visual segments in a document of the type shown in FIG. 1.

FIG. 3 shows a document 14 with different types of visual segments 24, all of which have been marked with bounding rectangles.

It is apparent from FIG. 3 that the different types of visual segments 24 present different visual appearances.

For example, a list 42 can easily be identified by observing the presence of bullets or numbers along a first column and the characteristic alignment of text along a second column to the right of the first column.

Other visually prominent features are associated with the other visual segments 24 shown in FIG. 3, namely the confidentiality notice 44, the footers 46, which can be identified because they repeat on each page at the same location near the page's bottom border, the headings 48, images 50, which are easily identified for their lack of text, labels 52, intra-image labels 54, page numbers 56, which are easily identified because they are typically numbers that increment with each page, paragraphs 58, and a table-of-contents 60. Other examples of visual segments 24 include titles, section headings, figures, tables, and captions.

After having identified the visual segments 24, the segmentation circuit 36 classifies them into different types. It then tags each visual segment 24 with a suitable semantic tag. The usefulness of classifying visual segments 24 arises because different types of visual segments 24 have been observed to interact in different ways to create different kinds of context.

The segmentation circuit 36 thus identifies different visual segments 24 and associates each such visual segment 24 with a suitable semantic tag. Examples of such tags include "heading" and "caption." In some examples, the visual segments 24 are assumed to be rectangular regions, each of which defines a "bounding boxes" that is itself defined by the coordinates of their upper left and lower right corners.

One method for detecting visual segments 24 is a rule-based method. In a rule-based method, a human designer crafts rules for classifying a visual segment 24 based on its visually observable features. An example of such a rule is, "If a visual segment 24 is less than two lines wide and appears within the top 5% of each page of the document, then classify it as a 'page header'".

Because the rule-based method is laborious, an alternative method is to train the segmentation circuit 36 using a training corpus of documents 14 in which visual segments 24 have been identified and classified a priori. A machine learning method can then be used to extract relevant features for identifying and classifying visual segments 24. Among these are cases in which the segmentation circuit 36 uses a convolutional neural network that output indicators of corners of bounding boxes for various tagged visual segments 24.

In other embodiments, the segmentation circuit 36 forms a generative model of a document 14. This would include placement of visual segments 24 and placement of characters within a visual segment 24. In such embodiments, segmentation of the document 14 becomes a combined recognition problem in which the interpretation circuit 38 carries out character recognition and the segmentation circuit 36 carries out visual segmentation.

The output of the segmentation circuit 36 identifies the visual segments 24. In some cases, the visual segments 24 are disjoint. In other cases, some visual segments 24 have additional visual segments 24 nested therein. For example, it is possible for a visual segment 24 that has been classified as a "graph" to coexist in the same document region as another visual segment 24 that has been classified as an "axis label."

In a preferred embodiment, the segmentation circuit 36 uses a parsing model that has been trained to be agnostic to orientation of the visual segments 24. As such, landscape orientation and portrait orientation result in the same visual segments 24. This is particularly useful in documents 14 that have visual segments 24 in both portrait and landscape mode. This can arise, for example if a figure caption is in portrait orientation while the figure that it captions includes sparse text in landscape orientation.

To improve performance, it is sometimes useful to disregard certain types of visual segments 24 based on an extent to which they are likely to be useful. Thus, the segmentation circuit 36 also carries out a cleaning and normalization procedure to omit such visual segments 24 as page numbers 56, the table-of-contents 60, and footers 46 and headers.

The visual parser's interpretation circuit 38 extracts semantic content from visual segments 24. Such semantic content is often useful for determining the nature of the context relationship between visual segments 24. For example, a visual segment 24 that explicitly refers to an image 50 would be expected to have some relationship to that image 50. A particularly useful tool for extracting semantic content is optical character recognition. Accordingly, it is useful for the interpretation circuit 38 to include an OCR circuit 62 to carry out this function.

Information from both the interpretation circuit 38 and the segmentation circuit 36 is provided to the linkage circuit 40. The linkage circuit 40 applies the contextualize operator as necessary and provides the knowledge base 16 with the various context relationships 30 that have been created for the document 14 in question.

A common feature of many documents 14 that are to be ingested is the presence of an image 50. In some cases, there exists text in an intra-image label 54 embedded within the image 50. For example, a photograph of a building may include the building's name carved on its façade. This intra-image label 54 would therefore be useful in responding to a question 20 about that building. Accordingly, the visual parser 30 causes a context relationship 34 to exist between the visual segment 26 that contains the intra-image label 54 and the visual segment 28 that contains the image 50.

A similar phenomenon arises in connection with figures and tables within a document 14. for example, a visual segment 24 tagged as a "table" may include a separate caption that appears, at least visually, to be inside of and part of the table. However, it is possible, and convenient, to separately tag such a visual segment 24 separately, for example as a "caption." This also occurs in figures, in which it is possible to separately tag visual segments 24 as being "abscissa" or "ordinate." This lower level of granularity in tagging visual segments 24 provides greater flexibility in defining context relationships 30 between visual segments 24.

This flexibility results in greater precision. For example, if, in response to a question 20, it turns out that a graph's abscissa is relevant, but the rest of the graph is not, it becomes possible to pinpoint that abscissa without having to also bring in the entire graph.

In other cases, the image 50 is a synthesized image that happens to also include text. An example would be image 50 in FIG. 3. Such images 50 are often found in slide presentations. In many cases, it is actually the text in the intra-image label 54 that is most pertinent. For example, in image 50, the non-textual material is primarily ornamental.

A conventional OCR circuit would ignore this text since it is actually part of an image and therefore, strictly speaking, not "text." In a preferred embodiment, the interpretation circuit's OCR circuit 62 is a hybrid OCR circuit that that carries out optical character recognition on text that is embedded within an image. For example, if an image 50 comprised a photograph with a street sign, the hybrid OCR circuit 62 would recognize the text on the street sign.

To further promote accuracy when decoding an image of the document 14 using the interpretation circuit 38, it is useful to take into account both the higher-level language and the underlying effects that can adversely impact the quality of the image preprocessing. For example, since defects in an image may not be global, it is preferable for the interpretation circuit 38 to limit the steps taken to remedy defects to only those regions that require it. Thus, when applying procedures such as image denoising, dilation/erosion and binarization, the interpretation circuit 38 only applies them locally. This is particularly useful since noise and background tend to change locally and since binarization requires adapting thresholds depending on the nature of the region.

The ability to seamlessly carry out optical character recognition across different fonts is particularly important because different types of visual segments 24 can often be distinguished by differences in font. For example, headers tend to be in a bolder and larger font than that of body text. Since excessively bold or thin characters can adversely impact the accuracy of recognition, it is useful for the interpretation circuit 38 to carry out such steps as dilation and erosion steps to compensate for such difficulties.

Further performance improvement arises from considering density of text. In some cases, the segmentation circuit 36 recognizes regions of sparse text, for example within figures and tables. To improve the interpretation circuit's ability to recognize characters, it is useful to segment regions that have high text density, such as paragraphs 58 or lists 42 within the table or figure.

Although text regions within a figure are often sparse in text, their visual relationship with the figure, i.e., the fact that they are actually within the figure, gives them disproportionate importance when answering questions that involve that figure, particularly when such that sparse text region has been identified as having a contextual relationship with another visual segment 24. By establishing a contextual relationship 30 between a sparse region and another visual segment 24, it becomes possible to retrieve the text in that sparse regions for use in responding to a question 20.

Additionally, the text in the sparse regions is available for formulating a new question that can then be used to interrogate the knowledge base 16 to identify further information that may be pertinent to responding to the user's original question 20.

The different semantic units 24 into which a document 14 is segmented can also be used to improve the accuracy with which the interpretation circuit 38 is able to recognize characters.

For example, in some cases, a document 14 has a visual segment 24 with a dark background that impedes character recognition. Since the visual segment 24 has been identified and the spatial region that it occupies in the document 14 is known, it is possible to lighten the dark background before optical character recognition operation takes place.

More generally, the colors of text and the background on which the text is superimposed have a dramatic effect on optical character recognition. This can be experienced by any human directly, simply by attempting to read light grey text on a slightly darker grey background.

Once a visual segment 24 has been defined and its bounding box specified, it is possible to analyze the colors present in the bounding box and to map those colors into standardized colors that have been tuned to the capabilities of the optical character recognition process. If, for some reason, an author of a document 14 opted to have dark blue text on a slightly darker blue background, it would be possible to map "dark blue" to "black" and "slightly darker blue" to "white," thus promoting the case with which optical character recognition can be carried out.

In general, there exists a source color space and a target color space. The source color space is the set of colors in the visual segment 24 in question. The target color space is defined by whatever the optical character recognition system regards as optimal for character recognition. The problem is therefore to construct an optimal mapping from the source color space to the target color space.

This can be carried out by determining a distribution of the values of pixels in the source color space and mapping to corresponding colors or intensities in the target color space. In some embodiments, the target color space is a binary color space in which only two colors are permitted. Among these are embodiments in which the two colors are black and white. In such cases, the mapping is a many-to-one mapping.

The existence of visual segments 24 also makes certain pre-processing steps for promoting the accuracy with which optical character recognition is carried out. Examples of such preprocessing steps include rescaling, binarization, noise removal, dilation, erosion, rotation, and de-skewing.

The task of optical character recognition can be viewed as essentially a sequence decoding problem. A useful way to decode a sequence is to use either a set of recurrent networks or a set of transformers. Another method for such decoding is that of using a language model and training it with the underlying words and the characters that make up the word. In such a training procedure, the semantic tag that was obtained by the visual parser 30 during the classification step becomes particularly useful for biasing the language model based on the language that is most likely to be found in a visual segment 24 of that class.

The existence of separate visual segments 24 also makes it possible to improve character recognition by enabling different visual segments 24 to be processed with different orientations.

For example, it is not uncommon for the visual segment 24 that encompasses a figure caption to have a horizontal orientation and for another visual segment 24, which encompasses the text along the figure's vertical axis, to be rotated by ninety degrees relative to the figure caption.

In some practices, the visual parser 30 accommodates these differences in orientation by repeating the optical character recognition process with four rotations that are separated from each other by multiples of ninety degrees and doing so for each visual segment 24. In other practices, the visual parser 30 implements an initial segmentation that estimates the orientation of each visual segment 24. This is carried out by using a machine-learning system that has been trained to not only classify a visual segment 24 but to also provide an estimate of its orientation.

It is useful at this point to draw a distinction between the document 14 itself and how the document 14 would appear to a person who looks at it, i.e., a rendered version of the document 14. When considering the world of physical documents 14, these are trivially the same. However, documents 14 of the type discussed herein need not be physical documents 14. As a result, the visual appearance of the actual document 14 can be quite different from its rendered appearance.

A readily understood example is the HTML file. The actual document 14 comprises a mixture of tags and content that, when viewed by a human reader, is difficult to comprehend. Yet, when rendered by a web browser, the document 14 takes on a decidedly different appearance.

The segmentation circuit 36 described above carries out a segmentation procedure for a document 14 that lends itself to visual inspection. An example of such a document 14 is one that results from simply having scanned a physical document.

However, many documents 14 that are to be ingested lack this property. This is especially common in the case of digitally born documents 14, in which the document 14 amounts to instructions for how to display it in a visual form so that it can be understood by a human being. Examples of such documents 14, in addition to HTML files, are portable document files and many proprietary file formats associated with various applications.

In many of the foregoing cases, characters and their locations are explicitly identified. However, there is no explicit partition into visual segments 24. A similar difficulty arises in certain tagged files, such as HTML files. In such files, tags specify how something appears. They do not specify how it relates in any semantic way to anything else.

In such cases, a useful way for the segmentation circuit 36 to carry out the segmentation procedure is to simply generate an equivalent image from that document 14 and to then carry out the segmentation procedure on this resulting image.

Since the document 14 in this case would explicitly have text in it, optical character recognition can be dispensed with. As such, the interpretation circuit 38 relies on the original document 14 rather than on its image.

The original format of the input document 14 dictates the steps carried out to transform that document 14 into corresponding ingested content. The most common such documents 14 are HTML files and PDF files.

In those cases in which the document 14 is an HTML file, the visual parser 30 begins the process by using a virtual headless browser to render a corresponding web page that corresponds to the HTML file. It then computes style information for each element on the web page thus rendered.

In the next step, the visual parser 30 expands the document's source HTML to include external style labels. This expansion step results in an expanded file. The expanded file is then downloaded and preprocessed. These steps are carried out to ensure its validity and to preserve its in-line formatting.

The next step is a parsing step. The parsing step includes parsing the HTML into an element tree and then creating a flattened list of high-level elements by recursively exploring that tree. The flattened list is defined according to a combination of hard-coded rules and configurable cascading style sheet selectors.

The next step is that of replacing certain container elements with their respective contents. This is carried out for those container elements that that do not themselves serve semantic functions. Completion of this step results in a list of high-level elements.

With the list of high-level elements now having been created, a final post-processing step is carried out to ensure HTML validity and to re-apply any omitted inline formatting. During this step, it is also possible to remove selected elements or to down-weight selected elements based on tags thereof.

The analogous process for portable document files is somewhat simpler. In such cases, the visual parser 30 classifies various semantic elements based on their visual appearance. Examples of such classes include headings, tables, and footnotes. The visual parser 30 also applies a semantic tag to each visual segment 24 to indicate its class.

Certain classes are considered to be of little value for answering questions. Visual segments 24 that have semantic tags identifying them as belonging to such classes are either down weighted or discarded. An example of such a class is a "table of contents."

Certain embodiments of the visual parser 30 use a language model to identify any irregularities in text that would likely impede comprehension thereof or to identify the use of a foreign language. Since such text would not be useful in answering a question, the visual parser either discards it or down weights it.

The various ingested documents 14, having been authored by different people, may not use the exact same language to refer to particular ideas. These minor variations may cause the question-answering system 10 to overlook certain text.

As an example, to refer to a personal computer, some documents 14 may say "P.C." whereas other documents 14 may say "PC." To enforce uniformity, it is useful for the interpretation circuit 38 to modify visual segments 24 so that all such references to a common idea use common term, i.e., a "canonical term." This process, which is referred to herein as "canonicalization," is also applicable to incoming questions 20.

The process carried out by visual parser 30 to classify a visual segment 24 depends on one or more of two factors: the segment's location in the document's visual structure and its text, either as recognized by OCR or as derived explicitly from the document.

In many cases, the content of a document 14 comprises instructions for rendering the document 14. Thus, when one inspects such a document 14, it is not immediately apparent what its visual representation looks like. As a result, a visual segment 24 that is easily recognized in the document 14 as rendered can be difficult to recognize when inspecting the actual content of the document 14.

One example of a visual segment 24 having the foregoing property is the confidentiality notice 44 shown in FIG. 3. Such a notice limits distribution rights, (e.g., "confidential", "top secret", etc.).

Another visual segment 24 having the foregoing property is a light grey watermark printed diagonally across each page.

Visual segments 24 of the foregoing type are often conspicuous in a rendered document. However, they are not easily recognized in the actual document 14 prior to rendering. The segmentation circuit 36 automatically identifies and classifies such visual segments 24 and uses the resulting information to label the relevant portions of the document 14 with the relevant restrictions on distribution. This enables the question-answering system 10 to exclude such information from an answer 18 if the user 22 does not have a need to know.

Other examples of visual segments 24 having the foregoing property include structured sections such as a table-of-contents 60 and an index. These visual segments 24 have characteristic visual indicia that are easily spotted upon visual inspection, such as a list-like format, lead lines or dots linking title words, and page numbers 56.

The semantic content of those visual segments 24 that have been classified as indices or tables of contents is of limited value when formulating an answer 18. Accordingly, in a preferred embodiment, the linkage circuit 40 avoids visual segments 24 that have been so tagged or links them in such a way as to inhibit retrieval of content from such visual segments 24. This avoids having information from such visual segments 24 clutter the answer 18.

On the other hand, a visual segment 24 classified as being a table-of-contents 60 can be useful when linked to the content identified in the table-of-contents 60, particularly for providing distant context due to explicit nested headings that may easily be discovered from the remainder of the document 14 itself. Accordingly, the linkage circuit 40 retains context relationships 30 for this purpose.

A useful property of a visual segment is its location relative to other visual segments. Relative locations between visual segments provide a basis for establishing a context relationship 34 between them. For example, in many cases, when the segmentation circuit 36 identifies first semantic unit as a heading, e.g., a chapter heading or a section heading, and a second semantic unit as text that immediately follows that heading, the linkage circuit 40 will link those two visual segments with a context relationship 34.

Another clue relied upon by the segmentation circuit 36 for identifying a visual segment 24 is the existence of text blocks arranged into visually distinct columns and rows and with headings on each column and by each row. Upon observing such visual features, a segmentation circuit 36 would classify the set of all text blocks as a visual segment of the type, "Table." For convenience in accessing information, it would also classify the text block in each row or column of this table as being a separate visual segment of the type, "Table Entry." This would result in a document region that has a superposition of different visual segments.

In some cases, a context relationship 34 between first and second visual segments 26, 28 arises from a combination of visual structure and semantic content.

In one example, a first visual segment 26 includes text of the form, "Referring to the graph shown in FIG. 1" and a second visual segment 28, which has been tagged as a "caption," begins with the text "FIG. 1." In such a case, the interpretation circuit 38 would observe this apparent relationship and provide this information to the linkage circuit 40, which would then establish an appropriate context relationship 34 between the first and second visual segments 26, 28.

In many cases, a context relationship 34 based on semantic content may not be as explicit as the foregoing. To identify more subtle context relationships, the interpretation circuit 38 relies on natural language techniques. In some cases, the interpretation circuit 38 looks for similarities between a visual segment 30 that discusses a particular graph and any similarity between that discussion and semantic content present in any visual segments 32 that have been tagged as "caption."

Since a question-answering system 10 is already available, one particularly useful technique to identify a relationship based on semantic content is that of constructing a question 20 based on text from a caption. The resulting question 20 is then posed to the question-answering system 10, which then identifies other visual segments 24 that may be relevant. The foregoing technique results in a recursive architecture in which the question-answering system 10 becomes a constituent of the interpretation circuit 38 that is itself a constituent of the question-answering system 10.

The foregoing process of identifying visual segments 24 based on visual structure of the document 14 and establishing context relationships 30 between visual segments 24 improves the quality of information presented to a user 22 in response to a question 20.

For example, consider a document 14 having first technical information, which concerns steam turbines, and second technical information, which concerns gas turbines. Suppose that the first and second technical information is fragmented across lengthy sections of a document.

Under the foregoing circumstances, it would not be unusual to find, within this document 14, a section for "Steam Turbines" and a section for "Gas Turbines." These sections would have similar but contradictory sentences, e.g., "The oil pressure should be kept between 2 bar and 3 bar" and "The oil pressure should be kept between 3 bar and 4 bar."

The original author was no doubt writing for an audience of people and not a question-answering system. As a result, the original author did not bother to include, in each sentence, the type of turbine being referred to. After all, a person would have been able to visually parse the document 14. In so doing, that person would have easily inferred, from context, which sentence to rely upon for steam turbines.

The visual parser 30 makes it possible for the question-answering system 20 to mimic this uniquely human ability. It does so by adding context relationships 30 between the visual segment 24 that contains each sentence and a corresponding heading. The addition of these context relationships 30 makes it possible to resolve the ambiguity and to preferentially present only the correct sentence to the user 22.

One way for the linkage circuit 40 to implement the contextualize operator is to replace the content of the second visual segment 28 with content that incorporates information indicative of a context relationship 34 with a first visual segment 26. The resulting content is referred to herein as "composite content."

In the example described herein concerning oil pressure in turbines, the content "The oil pressure should be kept between 2 bar and 3 bar" in the second visual segment 28 would be replaced by the composite content "Steam Turbine//The oil pressure should be kept between 2 bar and 3 bar//." The pre-pended text, i.e., "Steam Turbine," indicates a context relationship 34 in which the first visual segment 26 informs the meaning of the second visual segment 28.

The foregoing composite content allows the question-answering system 10 to recognize that all content between the double-slashes should have its meaning informed by the indicated context relationship 34 with "Steam Turbine." In effect, the linkage circuit 32 is doing what the original author of the document 14 might have done in response to having been told that the target audience would not be able to see the visual relationship between text and headings.

The linkage circuit 40 applies the contextualize operator to add a context relationship 34 in a similar way to other kinds of visual segment 24. For example, in those cases in which the visual segment 24 is a table, it is possible to replace the content of each cell in that table with composite content that also includes information about the row and column in which the cell is located and information taken from the table's caption, if any. In a similar way, for semantic content that has been tagged as a graph, the linkage circuit 40 replaces the graph's content with composite content that includes both the information in the original content and information from the graph's axis labels.

In yet another example, the linkage circuit 40 replaces content from visual segments 24 that correspond to elements of a list 42 with composite content that includes the original content with information from a sentence that precedes the list 42.

In some embodiments, the linkage circuit 40 adds a context relationship 62 by using a process other than concatenating context information to existing content to create composite content.

Among these are embodiments in which the linkage circuit 40 processes context separately from text relied upon as a basis for an answer 18. Among these are cases in which the linkage circuit 40 concatenates embeddings of questions and corresponding answers.

In other embodiments, the linkage circuit 40 relies on attention-based approaches in which words in a potential answer 18 are transformed based on context to yield representation of content into which context information has been integrated.

Thus far, the visual segments 24 have been static in nature, i.e., text and figures. However, the principles described herein are applicable for those cases in which the visual segments 24 are dynamic. Examples of such dynamic content include audio and video content. Documents 14 that include such dynamic segments are regarded as "multimodal documents."

For visual segments 24 that contain audio, the interpretation circuit 38 carries out a speech recognition process to transcribe the audio content.

For visual segments 24 that contain video content, the interpretation circuit 38 extracts selected frames. For example, in many video files, there exist certain frames, referred to as "keyframes," that define starting and ending points of particular scenes. To identify such keyframes, the interpretation circuit 38 carries out a conventional keyframe detection method.

For certain slide presentations, it is not unusual for audio and video content to go together. In such cases, it is useful for the interpretation circuit 38 to also synchronize audio content from a first visual segment 26, which contains audio, and video content, which is in a second visual segment 28 and which corresponds to the audio in the first visual segment 26. This is carried out by establish a context relationship between portions of audio content in the first visual segment 26 and corresponding portions of video content in the second visual segment 28.

A slide presentation itself often comprises a mixture of lists 42, paragraphs 58, and images 50 distributed in a two-dimensional space. Thus, a slide presentation is in effect a species of document 14. With that being the case, nothing stops the visual parser 30 from simply processing the slide presentation as a whole in the same way it would have processed a more conventional document 14.

Accordingly, the visual parser 30 would identify a slide's title, bulleted lists 42, and sequences of images 50 as visual segments that could then have context relationships 30 with each other as appropriate. The details of carrying this out are the same as that discussed in connection with other types of documents 14.

As was the case for a visual segment 24 that includes static non-textual content, such as an image 50, a visual segment 24 with dynamic content can include other visual segments 24 embedded within it. Accordingly, in some embodiments, the segmentation circuit 36 identifies a title of a slide within a slide presentation and creates a visual segment 24 corresponding to that title. Other features that the segmentation circuit 36 identifies in a slide presentation include bulleted lists 42 in slides.

The visual parser 30 identifies context relationships 30 between visual segments 24 that are separated by considerable distance within a slide presentation. It does so by observing such visual features within the slide presentation. An example of such a visual feature is a major section heading, which is often in a significantly larger font or in a different font style. In such cases, where one or more slides are between two successive section headings, the linkage circuit 40 creates context relationships 30 between each slide and the header that immediately precedes them.

Since multimodal content in a document 14 can be considered to be a visual segment 28, and since audio from multimodal content can be transcribed to form a transcription, that transcription is itself a visual segment 28 that can be treated in much the same way as a caption. In particular, the transcription is to the audio as the caption is to an image 50 that it captions. Accordingly, the linkage circuit 40 also forms context relationships 34 between audio content and its corresponding textual transcripts. Thus, in response to a question 20 that refers to subject matter found in the transcript, the question-answering system 10 will have a basis for retrieving the relevant audio. Such audio can then be provided to the user 22 either in its original audio form or as a transcription thereof.

As noted above, given a slide presentation with both an audio transcript and text embedded in the slides, two context relationships 34 can be established: one between a slide and its embedded text and another between the same slide and the textual transcript of audio content that goes with that slide. As a result, for each slide, there will exist two visual segments 24 that have a context relationship 34 with that slide: one that contains a transcript of audio narration and another that contains text embedded in the slide. This provides a level of redundancy that is useful for providing answers to questions 20.

For example, given a question 20 that refers to the subject matter of the slide, it is quite possible that the narration omitted any reference to certain text in the slide. This is not uncommon since a good presenter should do something other than simply read from slides.

Nevertheless, the question-answering system 10 will be able to match the text in that question 20 with text in a visual segment 26 that contain text embedded in the slide. Since a context relationship 34 would exist between that visual segment 26 and the visual segment 28 that contains the slide, the question-answering system 10 will now have a basis for drawing upon the slide itself for answering the question 20.

Conversely, it is quite possible that the presenter, while speaking about a particular slide, uttered words that are not in the slide at all. If those words match those in the question 20, the question-answering system 10 will then match the question 20 to the audio transcript. Again, since a context relationship 34 will exist between the visual segment 28 that contains that audio transcript and the visual segment 26 that contains the slide, the question-answering system 10 will once again have a basis for drawing upon the slide itself for answering the question 20.

Embodiments of the approaches described above in detail may be implemented in software, with computer instructions being stored on non-transitory machine-readable media. These instructions, when executed by one or more processors implement the functions described above. The instructions may be at various levels, from machine-level instructions, to instructions for configuring an artificial-intelligence system.

Although particular embodiments have been disclosed herein in detail, this has been done by way of example for purposes of illustration only, and is not intended to be limit the scope of the invention, which is defined by the scope of the appended claims. Any of the features of the disclosed embodiments described herein can be combined with each other, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

The invention claimed is:

1. A method comprising:
constructing a knowledge base for a natural-language question-answering system,
wherein constructing said knowledge base for said natural-language question-and-answering system comprises:
ingesting a document that comprises first, second, and third visual segments, each of which comprises semantic content, and
pre-processing said document to enable said question-answering system to access said semantic content in response to a natural-language question that has been posed by a user of said natural-language question-answering system,
wherein pre-processing said document comprises:
using a visual structure of said document to extract structural information from said document and incorporating said structural information in said knowledge base,
wherein said visual structure of said document comprises
a spatial distribution of said visual segments in said document when said document is in a form that renders said document visible,
wherein using said visual structure to extract structural information from said document comprises:
based at least in part on locations of said first and second visual segments relative to each other within said document, determining that a context relationship is to exist between said first and second visual segments,
based at least in part on locations of said first and third visual segments relative to each other within said document, determining that no context relationship is to exist between said first and third visual segments, and
establishing said context relationship between said first and second visual segments.

2. The method of claim 1, wherein determining that a context relationship is to exist between said first and second visual segments comprises determining that said context relationship is to exist based at least in part on a distance between said first and second visual segments and wherein determining that no context relationship is to exist between said first and third visual segments comprises determining that no context relationship is to exist based at least in part on a distance between said first and third visual segments.

3. The method of claim 1, wherein determining that a context relationship is to exist between said first and second visual segments comprises determining that said context relationship is to exist based at least in part on a using semantic information in addition to using said structural information.

4. The method of claim 1,
wherein determining that a context relationship is to exist between said first and second visual segments comprises determining that said context relationship is to exist based at least in part on a reference in said first visual segment to said second visual segment and
wherein determining that no context relationship is to exist between said first visual segment and said third visual segment comprises determining that no context relationship is to exist based at least in part on an absence of a reference in said first visual segment to said third visual segment.

5. The method of claim 1,
wherein using said visual structure to extract structural information from said document comprises classifying said visual segments into different classes based on differences in visual appearances of said visual segments,
wherein determining that a context relationship is to exist between said first and second visual segments comprising determining that said context relationship is to exist based at least in part on classes of said first and second visual segments, and
wherein determining that no context relationship is to exist between said first and third visual segments comprises determining that no context relationship is to exist between said first and second sematic segments based at least in part on classes of said first and third visual segments.

6. The method of claim 1,
wherein determining that a context relationship is to exist between said first and second visual segments comprises determining that said context relationship is to exist based at least in part on a using semantic information in addition to using said structural information and
wherein determining that no context relationship is to exist between said first and third visual segments comprises determining that no context relationship is to exist based at least in part on a using semantic information in addition to using said structural information.

7. The method of claim 1, wherein determining that a context relationship is to exist between said first and second visual segments comprises determining that said context relationship exists based at least in part on having determined that said first visual segment is a figure and that said second visual segment is a caption for said figure.

8. The method of claim 1, wherein determining that a context relationship is to exist between said first and second visual segments comprises determining that said context relationship exists based at least in part on having determined that said first and second visual segments have a common location.

9. The method of claim 1, wherein determining that a context relationship is to exist between said first and second visual segments comprises determining that said context relationship exists based on having determined that a first visual segment is a figure and that a second visual segment is text that is superimposed on said figure.

10. The method of claim 1, wherein said ingested document comprises instructions for causing said document to be rendered visible and wherein said method further comprises determining said visual structure based on said instructions.

11. The method of claim 1, wherein said ingested document is in a portable document format and wherein said method further comprises determining said visual structure of said document based on rendering instructions that are expressed in said portable document format.

12. The method of claim 10, wherein said ingested document is an HTML file and wherein said method further comprises determining said visual structure of said document based on tags in said HTML file.

13. The method of claim 1, further comprising determining that said context relationship exists based at least in part on having determined that said first visual segment comprises text arranged in rows and columns and on having determined that said second visual segment includes text at an intersection of one of said rows and one of said columns.

14. The method of claim 1, wherein using said visual structure to extract structural information from said ingested document comprises inspecting tags associated with said visual segments, said tags indicating that each of said visual segments belongs to a class in a set of classes, said set of classes comprising a list, a paragraph, a heading, and an image.

15. The method of claim 1,
wherein determining that a context relationship is to exist between said first and second visual segments and that no context relationship is to exist between said first and third visual segments comprises using both said semantic content in said first, second, and third visual segments and said structural information to determine that said context relationship is to exist between said first and second visual segments and that no context relationship is to exist between said first and third visual segments,
said structural information having been extracted based on instructions that are embedded in said document and that affect said visual structure of said document,
said document being a PDF document.

16. The method of claim 1, further comprising:
wherein incorporating the structural information in the knowledge base comprises storing a first item of composite content from a combination of content of the first and second visual segments in a computer storage;
receiving a natural language question that has been posed by a user of said natural-language question-answering system;
processing said question using a computer-implemented question answering procedure accessing content in the computer storage, including forming an answer to the question by retrieving the first item of composite content and processing the question and composite content using a natural language processing procedure; and
presenting the answer to the user.

17. The method of claim 16, wherein ingesting the document comprises forming a retrieval view of the first visual segment, said retrieval view including text content of the first visual segment, and encoding formatting properties of said segment determined from a visual representation of said segment, and wherein presenting the answer to the user comprises presenting a visual representation of the retrieval view.

18. A non-transitory machine-readable media comprising instructions stored thereon for execution by a data-processing system that has access to a knowledge base that has been constructed for a natural-language question-and-answering system and that comprises ingested documents, among which is an ingested document that comprises first, second, and third visual segments, each of which comprises content, wherein, when executed by said data-processing system, said instructions cause said data-processing system to pre-process said document to enable said question-answering system to extract said content in response to a natural-language question that has been posed by a user of said natural-language system, wherein pre-processing said document comprises: using a visual structure of said document to extract structural information from said document and incorporating said structural information in said knowledge base, wherein said visual structure of said document comprises a spatial distribution of said visual segments in said document when said document is in a form that renders said document visible, wherein using said visual structure to extract structural information from said document comprises: based at least in part on locations of said first and second visual segments relative to each other within said document, determining that a context relationship is to exist between said first and second visual segments, based at least in part on locations of said first and third visual segments relative to each other within said document, determining that no context relationship is to exist between said first and third visual segments, and establishing said context relationship between said first and second visual segments.

* * * * *